Feb. 22, 1966          HIROSHI KODERA ETAL          3,236,994
                  ELECTRON BEAM WORKING METHOD
                       Filed July 16, 1963
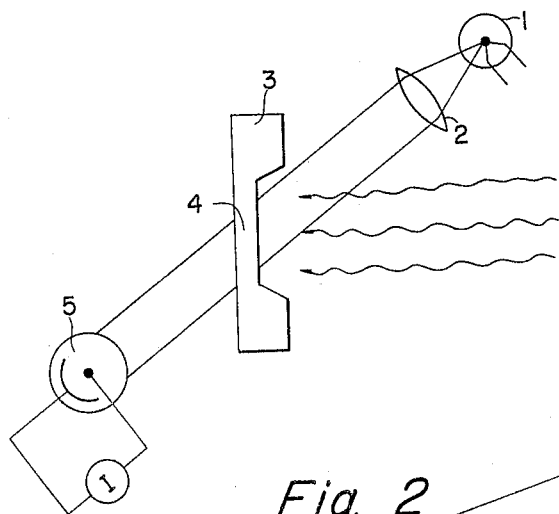
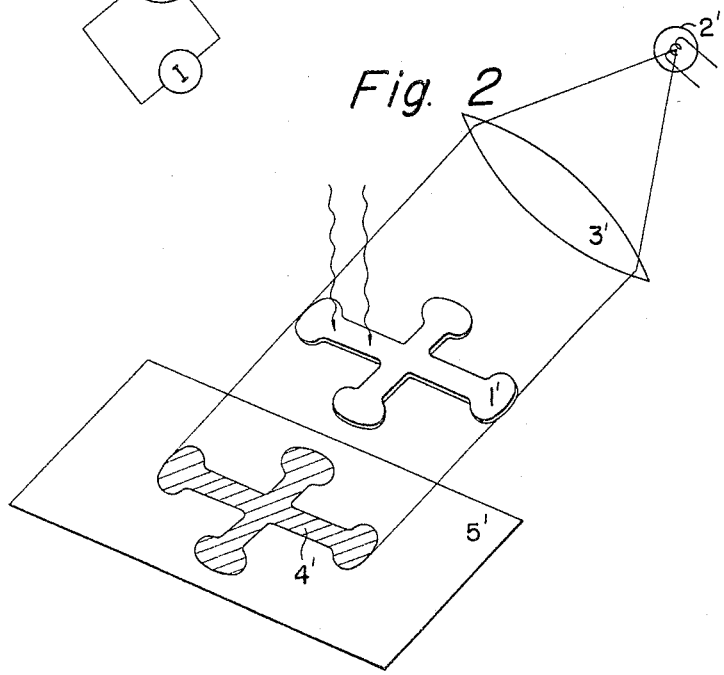
INVENTORS
Hiroshi Kodera
Hiroshi Ueda
BY
ATTORNEY

3,236,994
ELECTRON BEAM WORKING METHOD
Hiroshi Kodera and Hiroshi Ueda, Tokyo, Japan, assignors to Hitachi Ltd., Tokyo, Japan, a corporation of Japan
Filed July 16, 1963, Ser. No. 295,488
Claims priority, application Japan, July 23, 1962, 37/30,249
4 Claims. (Cl. 219—69)

The present invention relates to an electron beam treating method and particularly to a method for improving the accuracy of treating by controlling the shape, size and thickness of the treated portion of a workpiece during the processing by means of an electron beam.

An apparatus is known for treating a workpiece by means of an electron beam which is equipped with a driving mechanism for the workpiece holder, so as to shift the workpiece relative to the focus of the electron beam in accordance with a predetermined design program. The electron beam itself can be deflected electrically or magnetically to change the focussing point on the workpiece. By these means, the workpiece to be treated can be formed to a desired shape. Moreover, some apparatus is equipped with a light source and an observing system. For instance, the workpiece being treated (i.e. machining) is illuminated with light and its shape could be observed by an optical microscope. However, there have been several drawbacks in these known methods. If the apparatus is equipped only with the mechanism for deflecting the electron beam relative to the workpiece, it is impossible to observe the shape of the workpiece being treated. The addition of an optical microscope makes it possible to watch the machining condition of a workpiece, however, it is difficult to compare the shape of the workpiece directly with a designed shape. One of the main disadvantages of the usual method is the difficulty of controlling the thickness of the workpiece. For example, if a groove of a predetermined depth is to be formed, no method is known to observe the depth during the procedure.

It is one object of the present invention to provide an electron beam treating method wherein the above-mentioned drawbacks of the conventional electron beam treating techniques are overcome.

It is another object of the present invention to provide an electron beam treating method wherein the workpiece to be treated is illuminated by light and the image of the workpiece is observed from the direction opposite to the incident light and compared with a predetermined shape. The electron beam is controlled in such a way that the treatment is performed precisely in accordance with a predetermined shape. The word "machining" or "treating" herein used means "to cut a workpiece into a predetermined shape" and/or "to make a desired portion of the workpiece thinner for a desired amount."

The present invention is based on the wavelength absorbed by the material. Most metals and semi-conductors are opaque to visible light. Therefore, if the workpiece made of such material is illuminated by visible light, the shadow can be observed visually. The shadow may be a precise projection of the shape of the workpiece, provided the optical systems are properly adjusted. Usually, insulators and semi-conductors are opaque to the light, provided their wavelength is shorter than a certain limiting wavelength intrinsic to the material (absorption edge). The shadow of the workpiece can be observed by using a light which is not transmitted by workpiece appreciably. Such shadows can be used, in order to know the shape of the workpiece to be treated.

The projection of light through a workpiece depends usually upon the thickness of the workpiece at least in a limited range of the wavelengths. If the absorption coefficient is moderate, the intensity of transmitted light is sufficient for detection. Such light can be used be which has a wavelength component whose transmission depends on the thickness. The thickness of the workpiece can be determined by transmission of light. Simultaneous observation of the image and intensity of the penetrated light makes it possible to detect both the shape and depth of a groove formed by the electron beam.

The detectors which can be used to operate in accordance with the present invention, in particular for cutting, include a microscope, a vidicon, in particular an infrared microscope which uses an infrared image converter tube or an infrared vidicon or the like for cutting. In order to observe the image of a visible ray, it is possible to see the shadow projected on a screen and magnified, if necessary, through an optical microscope. The image on the screen can be magnified by a microscope and visualized through a vidicon camera on a Braun tube of an industrial television set. Silicon is transparent to the infrared whose wavelength is longer than 1.1 micron. In such cases, it is desirable to observe the projected infrared light, especially during the grooving process. For this purpose, an infrared microscope can be used. If the thickness of the treated portion is recorded by the projection of light, it is necessary to measure the intensity of light, so a photo-conductive detector, a photocell, a photomultipler, a photo-transistor or the like can be used.

The output signals of the detectors are compared with a reference signal corresponding to a predetermined shape and thickness and the error message is fed back automatically to change the intensity of the electron beam, pulse rate or the like. It is thus possible to perform the treatment automatically. It is also possible to treat the workpiece from both sides simultaneously, by using two electron beams.

The main advantages of the present invention reside in the fact that (1) the electron beam treating method is improved, which makes it possible to cut the workpiece to elaborate and complicated shapes, and the improvement of the accuracy and the reproducibility, and (2) a method of controlling the thickness and also to open the way for automatic treatment is brought about.

With these and other objects in view, which will become apparent in the following detailed description, the present invention will be clearly understood in connection with the accompanying drawings in which:

FIGURE 1 and FIGURE 2 are schematic diagrams showing embodiments of the invention.

Referring now to the drawings, and in particular to FIG. 1, a first embodiment is disclosed, which relates to the method for thinning workpieces to a predetermined thickness by using an electron beam. Light emitted from a light source 1 is beamed by a conventional lens system 2 upon the workpiece 3 during the thinning operation. The intensity of the transmitted light is detected by a photocell 5. Since the photoelectric current of the cell depends on the intensity of the transmitted light, as well as on the workpiece thickness, it is possible to obtain the thickness of the workpiece from the measured photoelectric current. The electron beam treatment is continued until the workpiece thickness attains a predetermined value.

A modification (not shown) of the disclosed embodiment is possible by using two electron beams, each of which impinges upon the workpiece from each side. This embodiment has the advantage that the thickness of the workpiece can be measured during the thinning process, without removing the workpiece from a vacuum chamber, thus reducing the time of thinning and also increasing the efficiency and reproducibility. The light source 1 must be such that the light emitted from the source 1 has a component of a wavelength in which the transmittance of the workpiece changes considerably with the thickness.

The second embodiment, disclosed in FIG. 2, relates to a method of cutting a workpiece to a predetermined shape. Light emitted from a light source 2' is beamed by a conventional lens system 3' to the workpiece 1' during cutting. The shadow 4' of the workpiece 1' is projected on a screen 5', which is made of roughened glass or the like. The shadow 4' on the screen 5' is compared with the previously designed shape. The electron beam is deflected relative to the workpiece to cut it precisely in accordance with the designed shape. In observing a small workpiece, an optical microscope is used to magnify the image. The image can be displayed on a Braun tube of industrial television system by using a vidicon camera to convert the optical image to electrical signals. An infrared image tube converts the infrared to visible light retaining the shape of the image. The shape of the silicon workpiece can be observed by this tube, since the infrared image tube has a sensitivity relative to the infrared light which the silicon transmits. Since the brightness of the image depends on the thickness of the workpiece, the relative thickness can be deduced from the brightness of the image. Therefore, it is conveniently used in the process of cutting grooves in silicon.

While preferred embodiments of the method of the present invention have been described in detail hereinbefore, it will be obvious to those skilled in the art that these embodiments are given for example only and not in a limiting sense, and various changes and modifications may be made therein without departing from the present invention, the scope of the present invention being determined by the objects and the claims.

What is claimed is:

1. A method of treating a workpiece comprising the steps of
    projecting a light beam on the workpiece to be treated to produce an image of the latter,
    comparing said image with a predetermined design,
    comparing the light intensity through said workpiece with a predetermined value,
    changing the position of an electron beam relative to said workpiece, and
    adjusting one of the electron beam current, pulse duty cycle and accelerating voltage, so as to produce the final image of said workpiece in accordance with said predetermined design.

2. The method, as set forth in claim 1, wherein
    said step of projecting a light beam is performed onto a screen, and
    treating the untreated portions of said workpiece until complete coincidence is obtained between said image and said predetermined design.

3. The method, as set forth in claim 2, which includes the steps of
    dividing said light beam,
    putting a standard workpiece in the light path between the workpiece to be treated and said screen,
    projecting one portion of said light beam onto said standard workpiece and the other portion of said light beam onto said workpiece to be treated, in order to detect the untreated regions of said workpiece to be treated.

4. The method, as set forth in claim 3, which includes the steps of
    beaming one portion of said light beam and the electron beam on said workpiece to be treated,
    beaming the other portion of said light beam on the corresponding portion of said standard workpiece,
    comparing the transmitted light intensities,
    feeding back an error signal produced in case of a discrepancy of said light intensities to the source of said electron beam,
    working the illuminated portion of said workpiece to be treated, thereby reducing said error signal, and
    varying the relative portions of the focus of said light beam and of said electron beam to said workpiece to be treated, until a coincidence of the image of said workpiece to be treated with said predetermined design is obtained.

References Cited by the Examiner

UNITED STATES PATENTS

| | | | |
|---|---|---|---|
| 2,057,325 | 10/1936 | Bouwers et al. | 250—59 |
| 2,159,035 | 5/1939 | McGrath. | |
| 2,474,906 | 7/1949 | Meloon | 88—14 |
| 2,812,685 | 11/1957 | Vossberg | 88—14 |
| 2,989,614 | 6/1961 | Steigerwald. | |
| 3,118,050 | 1/1964 | Hetherington | 219—121 |

RICHARD M. WOOD, *Primary Examiner.*

R. F. STAUBLY, *Assistant Examiner.*